March 31, 1953  C. A. BLAKE  2,632,932
CLOTHESLINE ADJUSTING DEVICE
Filed March 6, 1950  2 SHEETS—SHEET 1
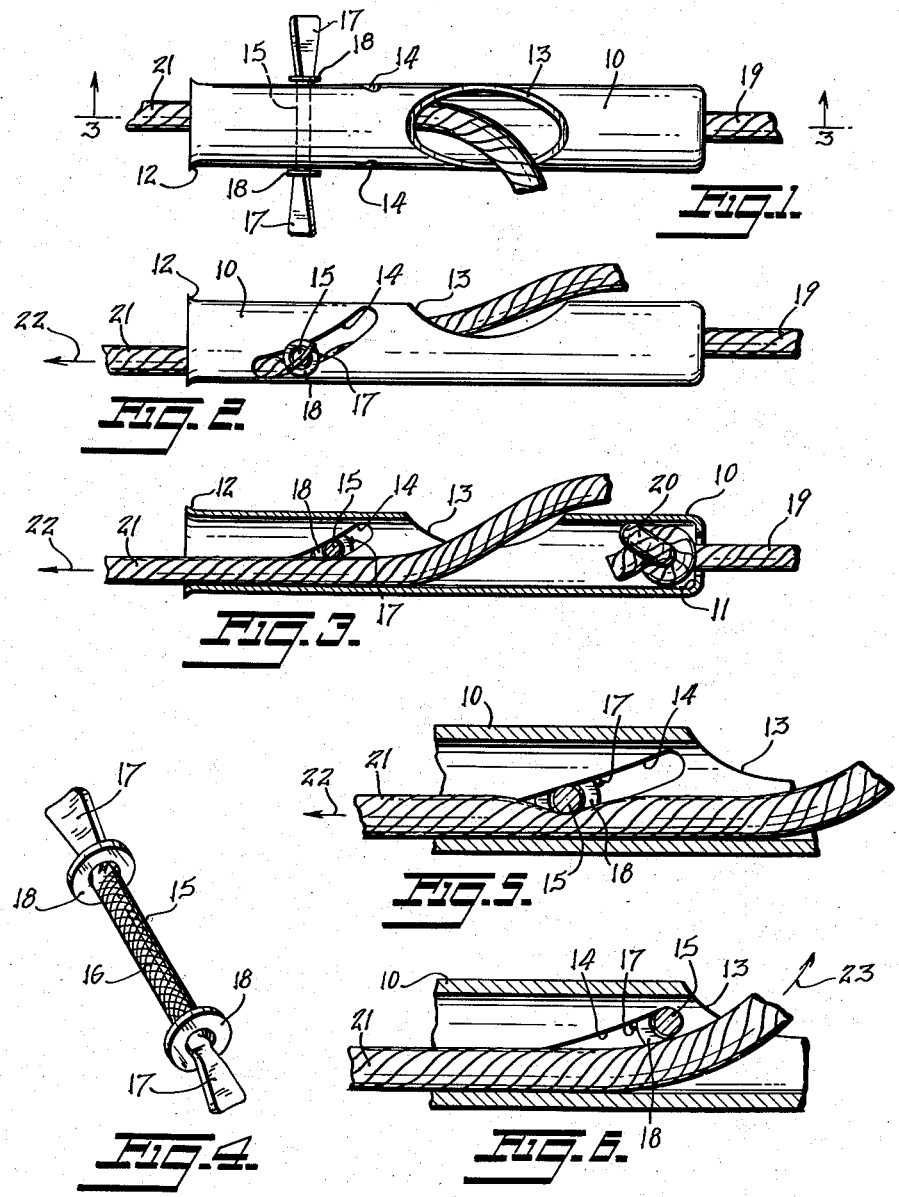
INVENTOR.
CHARLES A. BLAKE
BY
ATTORNEY March 31, 1953 — C. A. BLAKE — 2,632,932
CLOTHESLINE ADJUSTING DEVICE
Filed March 6, 1950 — 2 SHEETS—SHEET 2
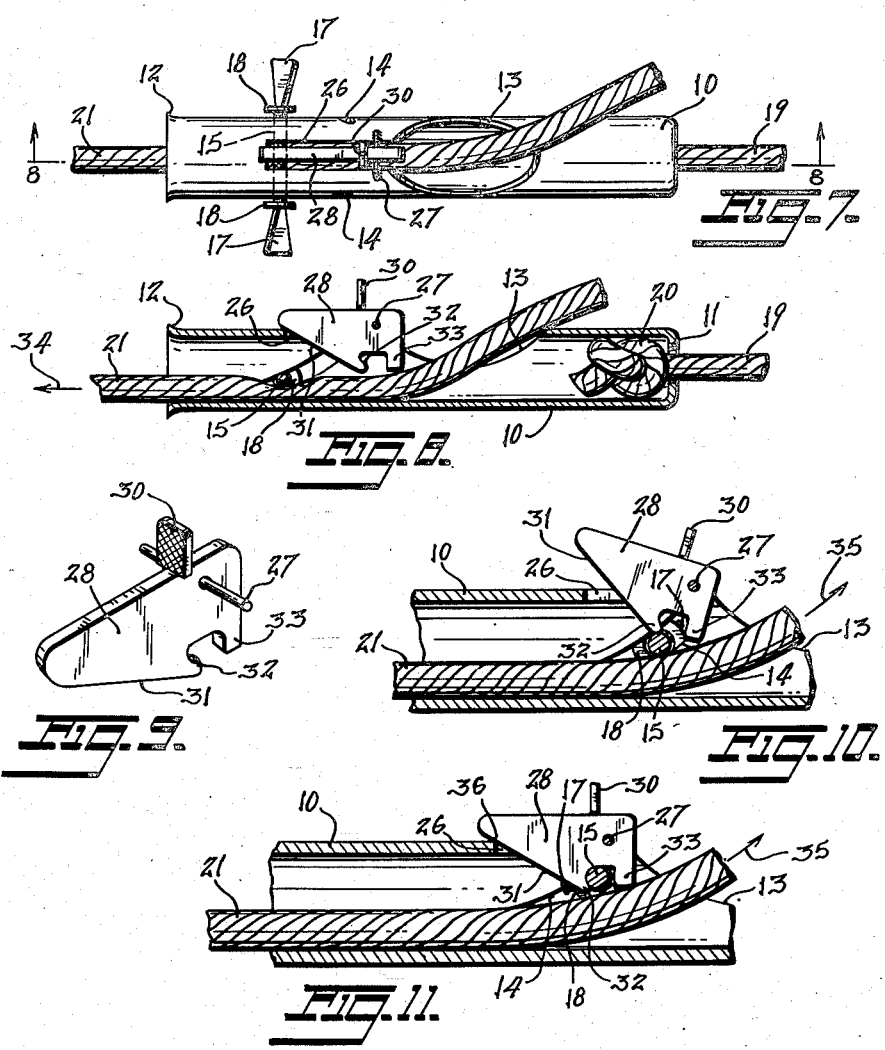
INVENTOR.
CHARLES A. BLAKE
ATTORNEY Patented Mar. 31, 1953

2,632,932

UNITED STATES PATENT OFFICE 2,632,932

CLOTHESLINE ADJUSTING DEVICE

Charles A. Blake, Bellmore, N. Y.

Application March 6, 1950, Serial No. 147,877

2 Claims. (Cl. 24—136)

This invention relates to clothesline adjusting devices and pertains particularly to a line clamp which is attached to one end of a line and receives the other end of said line in slidably adjustable association.

One object of the present invention is to provide a clothesline clamp whereby adjustments to the tautness of a line may be carried out with a minimum of effort.

Another object of the present invention is to provide in a clothesline clamp adapted for acquiring a desired tautness in a line, means whereby the gripping action of said clamp is rendered ineffective until that time when said action is desired.

Another object of the present invention is to provide with a clothesline adjusting clamp adapted to grip a loose end of a line when said end is pulled in one direction and to loosen its grip on said line when pulled in an opposite direction, means whereby the gripping element of said clamp is automatically disabled when said end is pulled in said opposite direction and other means whereby the disabled gripping element may be manually released to be effective to grip the line when pulled in said one direction.

Still another object of the present invention is to provide a clothesline clamp of simplified and economical tubular construction and including a minimum of movable elements, none of which are detachable and apt to be lost or mislaid.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a plan view of the first embodiment of the invention, wherein is illustrated the disposition of the gripping element when said element is effective.

Fig. 2 is a side elevational view of the embodiment of Fig. 1 and shows the inclined side slots with which the gripping element is adapted to coact.

Fig. 3 is a sectional view taken along the lines 3—3 of Fig. 1 and illustrates the manner in which the gripping element effectively coacts with the loose end of a line to thereby grip same.

Fig. 4 is an isometric view of the gripping element showing the knurled central surface thereof and the retaining washers carried loosely at the ends of said knurled surface.

Fig. 5 is an enlarged fragmentary sectional view illustrating the gripping action of the gripping element when the line is pulled in one direction.

Fig. 6 is an enlarged fragmentary sectional view illustrating the loosening effect of the line on the gripping element when said line is pulled in an opposite direction.

Fig. 7 is a plan view showing a second embodiment of the present invention.

Fig. 8 is a sectional view taken along the lines 8—8 of Fig. 7 and illustrates the automatic disabling means provided in the second embodiment.

Fig. 9 is an enlarged isometric view illustrating the disabling lever of the second embodiment.

Fig. 10 is an enlarged fragmentary sectional view showing the camming effect of the gripping element on the disabling lever.

Fig. 11 is an enlarged fragmentary sectional view showing the disabling lever effectively maintaining the gripping element out of coactive association with the line.

The clothesline adjusting device, according to the first form of the present invention shown in Figs. 1 to 6, includes a tubular primary member 10, which is of aluminum or similar corrosion resisting material, and is provided at one end with an internal shoulder 11 and at the other end with a flare 12. At the top side of said primary member 10 is provided a cut-out 13, which is herein shown as being arcuate but may be of any configuration. Cut into the sides of said primary member are opposed slots 14 which incline downwardly toward the above mentioned flare 12. Disposed in said slots 14 is a gripping element 15 (Fig. 4) which is provided with a knurled central surface 16, twisted and flattened end portions 17, and washers 18 loosely carried thereon between said knurled central surface 16 and said end portions 17. It will be seen that the twisted portions 17 maintain the washers 18 on said gripping element 15 and said washers are effective for retaining said gripping element disposed in said opposed slots 14.

Now it will be seen that one end 19 of a line may be passed into the tubular primary member 10 at the end of which the internal shoulder 11 is provided and when said line end is knotted as at 20 said internal shoulder will serve as an anchor therefor (Fig. 3). Instead of the internal shoulder 11, that end of the primary member 10 could be formed with diametrically opposite holes through which the end 19 of the line could be passed to then be tied to itself for connecting that end of the line to the primary member 10. As seen in Fig. 5, also, the loose end or the other end 21 of the line may be introduced into the flared end of the primary member 10, passed under the gripping element 15 and out of the cut-out 13.

When the said loose end 21 of the line is pulled in the direction of arrow 22 in Figs. 3 and 5 the said line will coact with the knurled surface 16 of the gripping element 15 to thereby cause said element to ride downwardly in the opposed slots 14 and progressively increase the gripping action thereof on the line. When it is desired to adjust the tautness of the line, said loose end 21 is pulled in the direction of arrow 23 in Fig. 6, and as therein seen this action causes said gripping element to ride upwardly in the slots 14 to thereby release its grip on the said line. With the grip thusly released the device may be freely moved along the loose end 21 until the desired tautness of the whole line is obtained.

In adjusting a line for tautness it is sometimes necessary for the adjusting device, such as that just described, to be moved back and forward over the loose end of the line until a desired degree of tautness is arrived at. In such cases it would be desirable for the gripping element to be rendered ineffective until that time when the desired tautness is obtained. To this end a second embodiment of the present invention provides disabling means for said gripping element.

The modification of the invention shown in Figs. 7 to 11 is similar to the first form described in connection with Figs. 1 to 6 in that it too includes a tubular primary member 10 having an internal shoulder 11 at one end and a flare 12 at the other, a cut-out 13, opposed slots 14, and a gripping element 15 movable along the length of the opposed slots. However, in the present arrangement the primary member 10 is provided at its top with an elongated longitudinal slot 26 opening out into the said cut-out 13. Disposed in said slot 26 and loosely pivoted on a pin 27, the ends of which are secured, as by welding, to said primary member at either side of said slot, is a disabling lever 28. Said disabling lever 28 is configured to provide a twisted finger portion 30, a cam surface 31, a hook 32, and an abutment 33.

Like the first described embodiment, the present arrangement is adapted to hold fast by means of the shoulder 11 to a knot 20 at one end of a line, and to have the loose end 21 of the line received through the flared end of the primary member 10 and passed under the gripping element 15 and out through the cut-out 13.

When the loose end 21 is pulled in the direction of the arrow 34 in Fig. 8, the gripping element 15 will ride down in the slots 14 and effectively grip the line. Pulling the line in the other direction or in the direction of arrow 35 in Figs. 10 and 11, causes said gripping element to ride upwardly in said slots. Now normally the hereinabove described disabling lever 28 rests as at 36, in Fig. 11, on the end of the longitudinal slot 26. However, when the gripping element 15 rides upwardly in the slots 14 it engages the cam surface 31 on said lever and rocks same clockwise (Fig. 10). The continued motion of the gripping element causes it to engage the abutment 33 to rock the lever counterclockwise and drop the hook 32 thereof in front of said gripping element (Fig. 11). Thusly, the said gripping element is automatically and effectively disabled simply by pulling the loose end 21 of the line in the direction of the arrow 35. When a desired tautness is thereafter obtained in the line, the finger portion 30 on the disabling lever 28 is manipulated to rotate said lever clockwise and thereby release said gripping element in order that it may be effective for gripping the line and thus maintaining the adjustment made thereto.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a clothesline clamp including a tubular frame provided with an outlet cutout and an arcuate slot, said slot receiving a gripping element slidable therein; an elongated slot in said frame and a disabling lever pivotally secured in said elongated slot in said frame, said lever including an inclined cam surface positioned in the path of movement of said gripping element and terminating in a hook portion, and a stop means on said lever and spaced from said hook portion to provide a gripping element receiving aperture when the element is to be loosened whereby the said element is disabled and kept inoperative.

2. The combination of claim 1 wherein said stop is an abutment extending from the bottom of the lever, a finger element on said lever and said cam surface is elongated to engage the end of said elongated slot to stop its pivotal movement.

CHARLES A. BLAKE.

REFERENCES CITED

The following references are of record in the file of this patent:

UNITED STATES PATENTS

| Number | Name | Date |
|---|---|---|
| 331,088 | Sackett | Nov. 24, 1885 |
| 1,263,995 | Bahr | Apr. 23, 1918 |
| 1,409,430 | Tarket | Mar. 14, 1922 |
| 1,450,094 | Lustgarten | Mar. 27, 1923 |
| 1,832,388 | Heisser | Nov. 17, 1931 |
| 2,349,114 | Russell | May 16, 1944 |
| 2,374,875 | McMurphy | May 1, 1945 |